Sept. 19, 1939.   B. B. TALLEY   2,173,140
APPARATUS FOR PRODUCING ORTHOGRAPHIC PROJECTIONS
Filed Jan. 14, 1938   2 Sheets-Sheet 1

Inventor
Benjamin B. Talley,
By Adam Richmond
Attorney

Sept. 19, 1939.　　　　B. B. TALLEY　　　　2,173,140
APPARATUS FOR PRODUCING ORTHOGRAPHIC PROJECTIONS
Filed Jan. 14, 1938　　　2 Sheets-Sheet 2
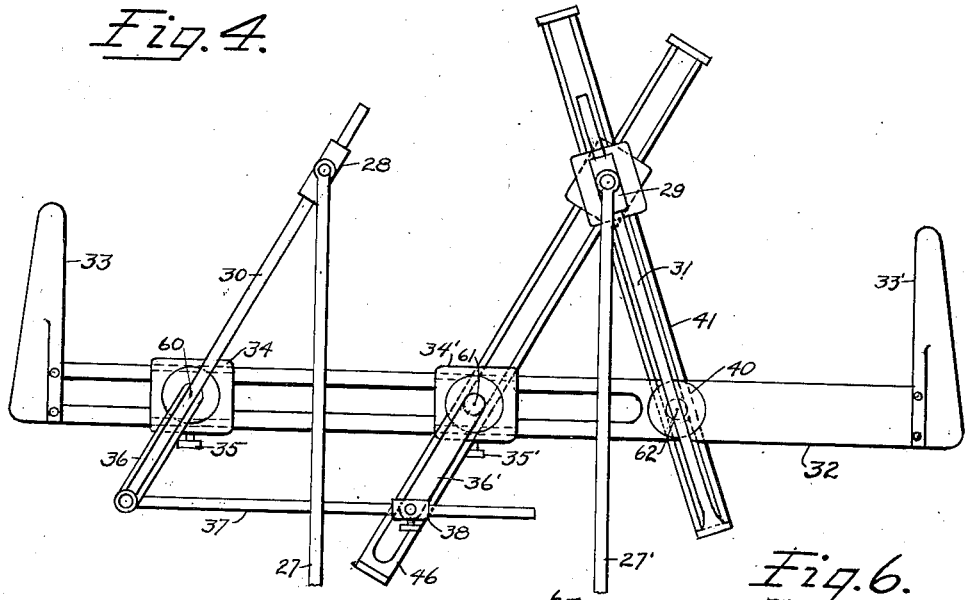
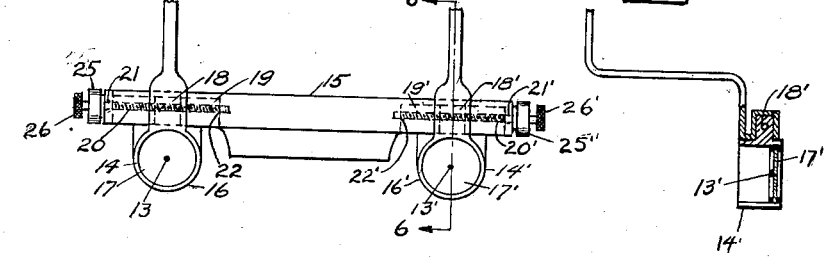
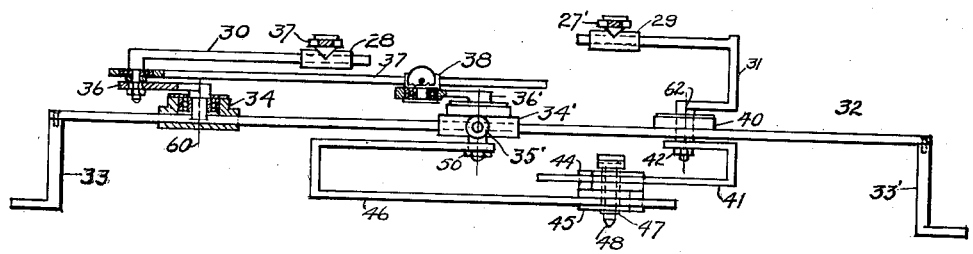
Inventor
Benjamin B. Talley,
By Adam Richmond
Attorney Patented Sept. 19, 1939

2,173,140

UNITED STATES PATENT OFFICE 2,173,140

APPARATUS FOR PRODUCING ORTHOGRAPHIC PROJECTIONS

Benjamin B. Talley, Portland, Oreg.

Application January 14, 1938, Serial No. 184,947

4 Claims. (Cl. 33—20)

(Granted under the act of March 3, 1883, as amended April 30, 1928; 370 O. G. 757)

This invention described herein may be manufactured and used by or for the Government for governmental purposes, without the payment to me of any royalty thereon.

This invention relates in general to cartography, but more particularly to a method and means for producing maps from aerial photographs.

The object of the invention is to provide a method and means adapted to produce orthographic contour maps, at predetermined elevations, from a series of overlapping aerial photographs.

Another object of the invention is to provide a simple and inexpensive portable instrument adapted to delineate the contour represented in stereoscopic views of overlapping aerial photographs at various scale, with extreme accuracy.

With these and other objects in view, this invention consists in certain novel details of construction, combination and arrangement of parts, to be more fully hereinafter described and claimed.

The method and apparatus for delineating the topographical outline representing contours at various elevations, as set forth by the instant invention, are based upon the established facts that, (a) directions aligned at the several picture points from the isocenters of photographs preserve the angles between them, the same on both image and picture planes, and (b) bearings of the several points, true orthographic projections may be obtained from two overlapping vertical photographs by a continuous solution of the simultaneous equations of the locus of the projection of the intersection of homologous rays of their perspective bundles.

The instrument is designed to automatically and continuously determine graphically the intersection of the two aforementioned bundles and to represent the said intersections in orthographic projection.

Briefly stated, the instrument comprises an adjustable viewing frame fitted with eyepieces through which a stereoscopic view of the photographs may be observed, and an adjustable series of interconnected members operating in conjunction with the movement of the eyepieces, to direct the movement of a marker adapted to delineate an orthographic representation of the contours formed by the intersection of the perspective bundles at various elevations.

Referring more particularly to the accompanying drawings in which corresponding parts are indicated by similar reference characters:

Fig. 4 is a top plan view of the drafting instrument;

Fig. 5 is a front elevation of the drafting instrument, in which the adjustable eyepiece support has been omitted; and Fig. 6 is a sectionized view taken on the line 6—6 of Fig. 4, showing a portion of the eyepiece adjusting mechanism.

If overlapping vertical aerial photographs I and II (Fig. 1) are mounted on a flat surface, such as a drawing table, so that stereoscopic bases 10—11 and 11'—10' are in prolongation of each other, and points 10 and 10' are their respective plumb points and isocenters, bearings from points 10 and 10' through points common to the overlap of the photographs I and II are independent of their relative elevations, and the directions are preserved as in the original object plane to wit: nature.

Figure 1:
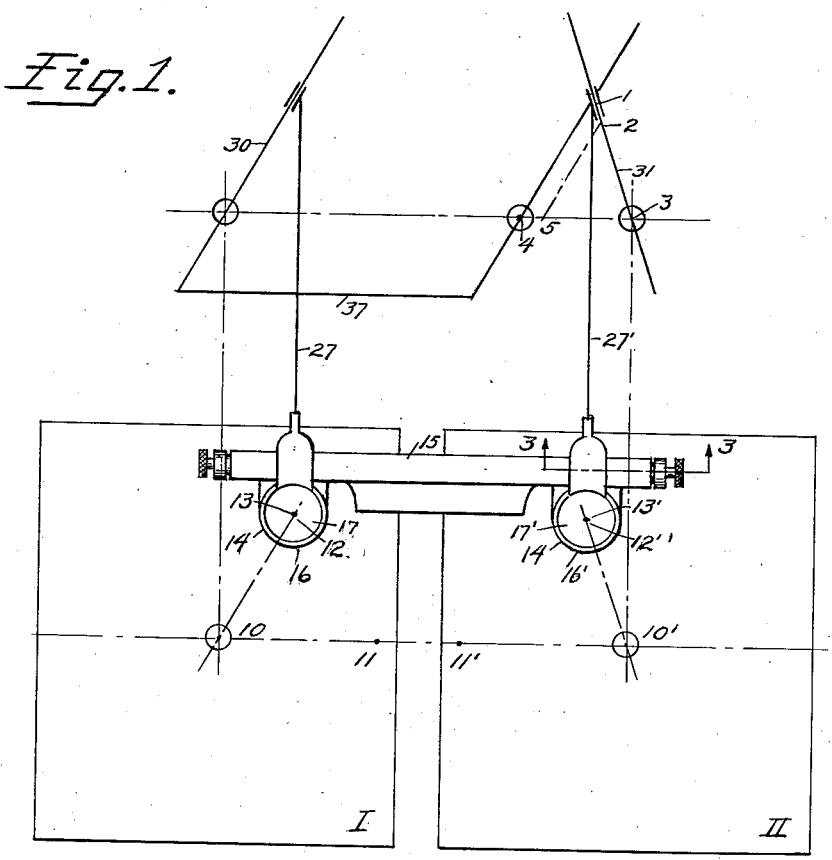
Fig. 1 is a top plan view showing the arrangement of the aerial photographs and the drafting instrument, the latter being shown partially as a schematic diagram in diagrammatic outline.
Figure 2:
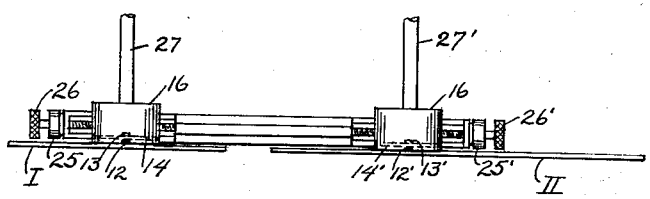
Fig. 2 is a front elevation of the adjustable eyepiece support.
Figure 3:
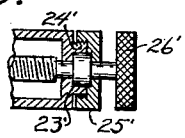
Fig. 3 is a partially sectionized view taken on the line 3—3 in Fig. 1, showing an eyepiece adjusting mechanism.

In Fig. 1, substantially vertical or rectified overlapping photographs I and II are mounted for stereoscopic observation, and 12 and 12' are photographic representations of an object or mark 12a located on the terrain photographed and adapted to be viewed by a suitable stereoscopic observing apparatus, which mark, in the stereoscopic view as in nature may appear above or beneath or rest upon a given horizontal plane.

When marks 12 and 12' are fused into a single mark 12 in the stereoscopic image of photographs I and II and photographic representations thereof designated by 12 and 12' are beneath the central marks 13 and 13' on the eyepieces 14 and 14' of the instrument, the marks 12 and 12' lie on imaginary radials from the plumb points or isocenters 10 and 10' of the photographs. Due to relief in the stereoscopic model the orthographic projection of the image of point 12a may not agree with the perspective position, i. e., there may be a displacement of the point along the radial due to the relief of point 12a with respect to the plumb points.

The stereoscopic model is the locus of all the points of intersection of the perspective cones which formed photographs I and II, and therefore to accomplish the continuous determination of these points, which form the locus of intersection of the two perspective cones, and to produce an orthographic projection thereof, there is provided a plotting device including eyepieces, through which the photographs may be viewed stereoscopically and corresponding points thereon combined and projected orthographically upon a drawing sheet at any desired constant scale.

The eyepieces 14 and 14' (see Figs. 1, 2, 4 and 6), which are mounted on a frame 15, comprise cylindrical supports 16 and 16' in which are mounted viewing glasses 17 and 17', marked centrally by the spots 13 and 13' or provided with cross hairs, as commonly used in optical instruments of this class.

The eyepieces 14 and 14' are provided with projecting bearing members 18 and 18' which are slidably mounted in longitudinal grooves 19 and 19' in the frame 15. Longitudinal movement of the eyepieces adapted to regulate their degree of separation from each other is effected by means of adjusting screws 20 and 20' which are in threaded engagement with the slidable bearing members 18 and 18'. These adjusting screws are rotatably mounted at each end within bearings 21 and 22, and 21' and 22', formed in the support and are prevented from having a longitudinal movement by means of collar portions 23 (not shown) and 23' formed integral with the screws and retained within bearings formed in annual externally threaded extensions 24 (not shown) and 24' on the ends of frame 15 by the internally threaded retaining caps 25 and 25'. The external extremity of each screw is fitted with a knurled head 26 and 26' respectively, which when turned in one direction or the other increases or decreases the distance between the eyepieces.

Rigidly connected to each eyepiece and adapted to coordinate the operation of the delineating portion of the apparatus with the viewing mechanism are links 27 and 27'. These links 27 and 27' are pivotally connected respectively to sleeves 28 and 29 which are slidably mounted on guide arms 30 and 31, as will be hereinafter further described.

The delineating portion of the apparatus, comprises a longitudinally slotted base 32 provided with lateral supporting members 33 and 33'. Longitudinally movable slides 34 and 34' provided with locking screws 35 and 35' are mounted on the base. These slides 34 and 34' are provided with ball bearing mountings for the accommodation respectively of rotatable crank 36 and the crank 36'. The crank 36' extends through the bearing in slide 34' and is provided with a threaded extremity for the attachment of a slotted guide member 46 which is rigidly united thereto by the nut 50.

Pivotally connected to the radial extremity of crank 36 is guide 30, which is slidably mounted within the sleeve 28, and connecting rod 37 which is slidably mounted in sleeve 38, the latter being pivotally connected to the radial extremity of the crank 36'.

In a bearing member 40 on the base 32 is rotatably mounted the guide member 31, which slidably supports sleeve 29 and extends through the bearing member 40. The extended pivotal portion of the guide 31 is provided with a threaded extremity for the attachment of the guide member 41 which is fastened thereto by a nut 42.

Guide members 46 and 41 are each slidably mounted in the rotatably connected slide members 44 and 45 which are mounted on a sleeve or bushing 47, the latter being adapted to retain a marker 48, such as a pencil, stylus or pen.

In the operation of the plotting instrument, after arranging the overlapping photographs I and II on the flat surface, with their isocenters 10 and 10' and stereoscopic base lying on the same horizontal line, the pivotal points or centers 60 and 62 of the slide 34 and the bearing member 40 are placed perpendicularly above and at equal distances from the isocenters of the photographs, and the guide member 46 arranged for parallel movement with respect to guide member 30 by means of the adjusting sleeve 38 on connecting rod or drag link 37. The photographs are then viewed with a stereoscope through the eyepieces 14 and 14' to determine corresponding points over which the marks 13 and 13' or crossbars on the glasses of the eyepieces are respectively placed, and the marker 48 which is slidably mounted in the sleeve or bushing 47 located in the slides 44 and 45 at the intersection of the guides 41 and 46 pressed down against a sheet of drawing paper underlying the instrument. The mark of the pencil indicates the orthographic projecting of the point observed on the stereoscopic image. In like manner a series of such points may be projected to form an orthographic contour of a line extending between a number of points on the stereographic image.

To provide flexibility of scale and to materially reduce the physical dimensions of the plotting system, pencil guides 41 and 46 are connected to guides 31 and 36 respectively, the latter through the connecting rod 37, being controlled so that it will move parallel to the guide arm 30. In the arrangement set forth the pencil guide 46 is pivoted within the bearing in slide 34' which may be moved along the stereoscopic base in either direction. The pencil is freely and flexibly mounted within the sleeve 47 and is thereby held always at the intersection of the pencil guides 41 and 46.

A decrease in scale is effected by moving the pivotal point 61 or center of the bearing in slide 34', towards the pivotal point 62 of bearing 40, and adjusting the sleeve on connecting rod or drag link 37 so that the guide 46 will move parallel to the guide arm 30, the pencil will then be moved from position 1 to position 2, as indicated in the diagrammatic portion of Fig. 1. It will be noted in Fig. 1, that the triangle 4—1—3 is similar to but smaller than triangle 5—2—3, and the scale or amount of movement of marker at the intersection of guides 41 and 46 is correspondingly smaller.

To effect an increase in scale it is only necessary to move the slide 34' on which the pivotal point of guide 46 is located away from the pivotal point 62 or guide 41. When the base lengths 10—11=10—10'=61—62, or the distances between the center lines of the bearing in slide 34' and bearing 40, the pencil draws at a scale equal to that of the photographs.

The true orthographic projection of any point A in a photograph lies somewhere on the line of its bearing from the plumb point, and the true orthographic position is at the intersection of the radials. The image point is displaced inward or outward on the photograph along this line depending upon whether the point is lower or higher than the plumb point. Such displacement is the parallax due to relief, sometimes called relief displacement, and may be broken up into two components; one parallel to the stereoscopic base called "$bx$" and one component normal thereto in the same horizontal plane called "by". By the measurement of the difference between the bx-components of the parallax; differences in the elevation between successive points are determined.

To effect measurements of differences in elevations it is only necessary to move mark 12 towards or away from mark 12' depending upon whether the point concerned is higher or lower than the point on which the floating mark has been previously fused or in other words, the previous points in the photographs which when viewed stereoptically form an image of a point on the terrain. In the relative movements of the marks 10 and 10' to maintain fusion on points of different elevations the position of the pencil is not disturbed, and scale errors due to relief are thereby corrected.

To compile the planimetry of photographs I and II, they should be mounted as previously outlined and with pivotal point 61 set to give the desired scale, fuse marks 12 and 12' on the surface of the stereoscopic model and then scan the photographs in pursuit of the desired detail, and pencil 48 will trace the orthographic projection of the photographs at the chosen scale. In this process, the separation of marks 12 and 12' is continuously varied to maintain the floating mark on the varying surface of the model.

To contour, set marks 12 and 12' to agree with the desired elevation, scan the model while keeping the floating mark always in contact with it, and the pencil P will trace the lines of equal elevation, i. e., the contours in an orthographic projection onto the datum plane.

With vertical photographs, or slightly tilted photographs adjusted in plate holders the result will be a true map, in distance, directions and elevations. Neglected departure from the vertical of 3° will cause errors in the direction of the radials of 1.7' of arc, resulting in a mean horizontal plotting error of about one part in seven hundred fifty, (1/750), which is about the limit of visual accuracy in drafting.

The mechanical adaptation of the design as shown in the attached drawings is suitable for small photographs, the details of which are made with a view to simplicity of construction for adaptation to a modification of my invention known as the stereo-comparagraph for which patents are pending.

This invention is not limited to the utilization of photographs of small dimensions, to this adaptation, nor to those obtained by single lens cameras, but is equally applicable to multi-lens composites made with aerial cameras of two, three, four, five, nine or other combinations of lenses in single aerial cameras, or to the composites made from two five-lens aerial cameras operated in tandem, in which case chains of gears, handwheels, and driving rods are wholly or in part substituted for the connecting links shown in this adaptation of the machine. In this invention, stereoscopic observation is by either a mirror stereoscope, a magnifying mirror stereoscope, or by a prismatic magnifying stereoscope; the sheaves of observing light rays of which are either normal to the photographs or substantially so at the point of impact therewith.

This is accomplished by a stereoscope (not shown) with eyepieces fixed in a position convenient and comfortable to the operator; or, a stereoscope mounted to a carriage to move as a whole over the photographs, resting either directly thereon, on a pane of glass resting thereon, or on supports elsewhere than on the photographs. In each case the sheaves of rays of light by which observation is made are perpendicular to the photographs, or substantially so, differing therefrom as corrections for tip and tilt, and the spread of the cone of rays may cause them to be.

Irrespective of the errors of the stereoscopic observation system the measuring device for determining parallax differences is either in actual contact with the photographs, or immediately thereabove, so as to be independent of the stereoscopic observational errors.

The forces required to actuate the plotting and measuring system are first externally applied to the instrument substantially at the frame, frames or the base by which the floating marks are held, such forces being carried through links 27 and 27' to the plotting system, and through the base, or other members to the stereoscope either in whole or in part.

The parallax measuring device consists essentially of two halves of a floating mark 13 and 13' fixed to a suitable carrier, or carriers, such as a lens, a prism, a mirror or a transparent plane surface so as to be in contact with or immediately adjacent to the portion of the photographs undergoing measurement. Such halves of the floating mark are capable of movement towards or away from each other along "bx", or in a relative direction normal thereto "by".

If the half-floating marks be carried by a prism or mirror, such prism or mirror is in turn so mounted as to divert the light rays impinging thereon to a direction normal to the photographs, or substantially so. The said half-floating marks being immediately adjacent to the photographs.

Having described my invention, what I claim as new and wish to secure by Letters Patent is:

1. A device for producing an orthographic projection from stereoscopic overlapping photographs consisting of an optical system including a pair of eyepieces, said eyepieces being individually adjustable relative to each other and simultaneously movable as a unit for scanning and corelating identical marker points on said photographs, a delineating system coacting with and actuated by the relative adjustment and scanning movement of the eyepieces of said optical system, said delineating system including means for describing an orthographic projection of the stereoscopic outline defined by the optical system, said means comprising a marker and a double set of concomitantly movable parallel members connected with and controlling the movement of the marker.

2. A device for producing an orthographic projection from stereoscopic overlapping photographs consisting of an optical system including a pair of eyepieces, said eyepieces being individually adjustable relative to each other and simultaneously movable as a unit for scanning and corelating identical marker points on said photographs, an adjustable delineating system coacting with and actuated by the relative adjustment and scanning movement of the eyepieces of said optical system, said delineating system including means for describing an orthographic projection of the stereoscopic outline defined by the optical system, and additional means in connection with the delineating system to vary the scale of said orthographic projection.

3. A device for producing an orthographic projection from stereoscopic overlapping photographs consisting of an optical portion, comprising a movable frame, right and left eyepieces, longitudinally adjustable on said frame, adapted for stereoscopic observation of said photographs; a delineating portion, and linking members cooperatively uniting said optical portion with said delineating portion, said delineating portion comprising a supporting base, two slide members, provided with vertical bearings, longitudinally adjustable on said base, and a vertical bearing mounted on said base; super-base elements comprising outer and inner parallelly movable guide arms and an auxiliary guide arm pivotally mounted respectively in said slide bearing and said base bearing, the pivotal portion of said inner and said auxiliary guide arms extending through said bearings; sub-base elements comprising inner and auxiliary guide members connected to the pivotal projecting portion of the corresponding super-base guide members, and a slide member longitudinally movable on said sub-base guide members, a central bushing providing a pivotal vertical mounting for said guide members and a marker slidably mounted in said bushing adapted to delineate the orthographic projection.

4. A device for producing an orthographic projection from stereoscopic overlapping photographs consisting of an optical portion, comprising a scanning means including right and left eyepieces, adapted for stereoscopic observation of said photographs and a delineating portion provided with linking members cooperatively uniting said optical portion with said delineating portion, said delineating portion comprising a supporting base; super-base elements pivotally and slidably mounted on said base and cooperatively united to said optical portion through said linking members, adapted to convert the scanning movement of said eye-pieces into pivotal movement on said guide members; intersecting sub-base guide elements coacting with said super-base elements, slide members mounted at the intersection of said sub-base elements and a marker retained by said slide members, said slide members being adapted to coordinate the pivotal movement of the sub-base elements to produce an orthographic projection by a resultant movement of the marker.

BENJAMIN B. TALLEY.